Patented May 15, 1934

1,959,160

UNITED STATES PATENT OFFICE 1,959,160

MICROPOROUS RUBBER AND METHOD OF MAKING THE SAME

Harold W. Greenup, Akron, Ohio, assignor to The Firestone Tire & Rubber Company, Akron, Ohio, a corporation of Ohio No Drawing. Application September 29, 1933, Serial No. 691,503

10 Claims. (Cl. 18—53)

This invention relates to microporous rubber and to methods of making the same.

The microporous rubber embodying and made according to the invention is suitable for any purpose where a pervious rubber diaphragm is to be used, and it is especially applicable for use in the manufacture of separators for storage batteries. The invention is an improvement upon the method set out in U. S. Patent No. 1,156,184 to Schidrowitz and Goldsbrough, and the porous body of U. S. Patent No. 1,651,567 to Wilderman.

The chief objects of the invention are to provide an improved microporous rubber sheet, to provide an improved method of making the same, to provide an improved method of coagulating rubber latex, and to provide an improved coagulant for rubber latex. More specifically, the invention aims to produce improved battery plate separators of microporous rubber, which will be equal or superior to wood or other porous rubber separators in durability and electrical conductivity; and to provide separators, the use of which will give greater capacity to batteries. Further objects are to reduce the cost of rubber battery plate separators of the character mentioned; and to provide for the full molding of the same. Other objects will be manifest.

In the present invention the porous rubber sheets or battery plate separators are made directly from rubber latex by coagulating the latter, and then vulcanizing the wet coagulum. Heat accelerates coagulation, so that preferably coagulation is effected by the initial heating during the vulcanizing operation, thus expediting the process. Upon coagulation, the solid rubber particles or globules aggregate and adhere to each other in the form of a colloidal net or reticulated mass in which the water constituent is still present, both the rubber network and the water being continuous from one side or margin of the mass to the other. Vulcanization is effected under conditions which prevent the escape by evaporation or otherwise of the water in the pores of the coagulum, so that the cell walls in the structure, due to the presence of water, do not collapse. To this end vulcanization is carried out under water or in saturated steam or in a closed mold. After vulcanization the product is dried to remove the water therefrom.

For producing the improved microporous rubber product I employ rubber latex, zinc oxide as an activator, sulphur to effect vulcanization, ethylene diamine and di-phenyl-guanidine to effect coagulation, an accelerator, and water to dilute the mass to proper consistency. The several ingredients are thoroughly mixed, and then poured into a mold. The latter is then preferably placed in a bomb with almost enough water to cover, and subjected to heat for the requisite period to effect coagulation and vulcanization.

The latex employed preferably is ammonia preserved centrifuged latex of substantially 58% dry rubber content. The zinc oxide is used in the form of a paste (40% ZnO). The sulphur used is a 50% colloidal sulphur paste ground in a ball mill. The ingredients employed to effect coagulation are ethylene diamine, $C_2H_4(NH_2)_2$, and sym-di-phenyl-guanidine, $HN=C(NHC_6H_5)_2$, the ethylene diamine being a 60% solution and the di-phenyl-guanidine being dry. The accelerator used is 2-mercapto-benzo-thiazole, a 10% solution in dilute ammonia (3% $NH_3$).

The function of ethylene diamine is to prevent thickening and coagulation at room temperature when di-phenyl-guanidine is employed as the coagulant. Di-phenyl-guanidine alone would cause thickening and coagulation to take place slowly at room temperature so that it would be necessary to chill the latex to below room temperature to keep it from coagulating. Through the joint presence of both ethylene diamine and di-phenyl-guanidine, entrapping of air bubbles is avoided and the formation of a tougher coagulum at elevated temperatures is effected. This is desirable for the formation of a strong cured product.

The proportions of the constituent ingredients may be varied to produce articles of different physical characteristics as desired, according to the following illustrative examples in which the ingredients are used in the form disclosed above:

*Example 1*

|  | Lbs. | Oz. |
|---|---|---|
| Latex | 51 | 3 |
| Zinc oxide paste | 1 | 9 |
| Sulphur paste | 27 | |
| Ethylene diamine solution | 1 | .9 |
| 2-Mercapto-benzo-thiazole solution | 5 | 2 |
| Di-phenyl-guanidine | | 12 |
| Water | 12 | 13 |

The mixture contains 29.2% rubber, 49.8% solids, and a sulphur-to-rubber ratio of 50%. Battery separators made from the foregoing formula have fairly good strength, and their electrical resistance is .031 ohms per square inch as compared to .05 ohms per square inch for wood separators.

Example 2

|  | Lbs. | Oz. |
| --- | --- | --- |
| Latex | 57 | 11 |
| Zinc oxide paste | 1 | 12 |
| Sulphur paste | 30 | 11 |
| Ethylene diamine solution | 1 | 12 |
| 2-Mercapto-benzo-thiazole solution | 5 | 12 |
| Di-phenyl-guanidine |  | 13 |
| Water | 1 | 9 |

This mixture contains 33% rubber and 51.9% solids, but has the same sulphur-to-rubber ratio (50%) as Example 1. Battery separators made from this mixture are of greater strength than those made according to Example 1, and their electrical resistance is .055 ohms per square inch, about the same as wood separators.

Example 3

|  | Lbs. | Oz. |
| --- | --- | --- |
| Latex | 63 |  |
| Zinc oxide paste | 1 | 14 |
| Sulphur paste | 23 | 14 |
| Ethylene diamine solution | 1 | 14 |
| 2-Mercapto-benzo-thiazole solution | 6 | 5 |
| Di-phenyl-guanidine |  | 14 |
| Water | 2 | 3 |

This mixture contains 38.5% of rubber and 52% of solids and has a sulphur-to-rubber ratio of 36.5%. Battery separators made from this mixture are more flexible and less brittle than those of the previous examples.

Battery separators made according to the examples given have been installed in standard storage batteries and the batteries, together with batteries having the usual wood separators, tested against each other for capacity. Batteries insulated with separators made according to Example 1 had 11% more capacity at 80° F. than those insulated with wood separators, 10.5% more at 10° F., and 54% more at 0° F. Batteries containing separators with higher rubber content (Example 2) had slightly less capacity at room temperature, but this difference disappeared at low temperature.

The invention provides an economical method of making microporous rubber, it produces battery separator plates superior to wood separator plates in durability and electrical conductivity, and it accomplishes the other objects set out in the foregoing statement of objects.

Chemical equivalents of di-phenyl-guanidine may be substituted in the formulae, as for example phenyl-tolyl-guanidine, di-ortho-tolyl-guanidine and triphenyl-guanidine.

Modification is possible without departing from the spirit of the invention or the scope of the appended claims.

What is claimed is:

1. The method of making microporous rubber which comprises treating rubber latex with vulcanizing agents and a coagulant comprising ethylene diamine and di-phenyl-guanidine, and then vulcanizing the mixture while wet.

2. The method of making microporous rubber which comprises treating rubber latex with ethylene diamine, di-phenyl-guanidine and vulcanizing agents, confining the mixture, and then subjecting it to heat to effect coagulation of the mixture and subsequent vulcanization thereof.

3. The method of making microporous rubber which comprises treating rubber latex with zinc oxide, sulphur, 2-mercapto-benzo-thiazole, di-phenyl-guanidine and ethylene diamine, coagulating the mixture, and vulcanizing the wet coagulum without loss of water.

4. The method of making microporous rubber which comprises treating rubber latex with vulcanizing agents, an accelerator, ethylene diamine and di-phenyl-guanidine to effect coagulation, and then vulcanizing the wet mix while confining same.

5. The method of coagulating rubber latex comprising mixing the latex with ethylene diamine and di-phenyl-guanidine at room temperature and heating the mixture.

6. The method of making microporous rubber which comprises treating rubber latex with vulcanizing agents and a coagulant comprising ethylene diamine and a reagent selected from the group consisting of di-phenyl-guanidine, di-tolyl-guanidine, di-ortho-tolyl-guanidine and tri-phenyl-guanidine, and then vulcanizing the mixture while wet.

7. The method of making microporous rubber which comprises treating rubber latex with ethylene diamine, a reagent selected from the group consisting of di-phenyl-guanidine, di-tolyl-guanidine, di-ortho-tolyl-guanidine and triphenyl-guanidine, and vulcanizing agents, confining the mixture, and then subjecting it to heat to effect coagulation of the mixture and subsequent vulcanization thereof.

8. The method of making microporous rubber which comprises treating rubber latex with zinc oxide, sulphur, 2-mercapto-benzo-thiazole, a reagent selected from the group consisting of di-phenyl-guanidine, di-tolyl-guanidine, di-ortho-tolyl-guanidine and triphenyl-guanidine, and ethylene diamine, coagulating the mixture, and vulcanizing the wet coagulum without loss of water.

9. The method of making microporous rubber which comprises treating rubber latex with vulcanizing agents, an accelerator, ethylene diamine and a reagent selected from the group consisting of di-phenyl-guanidine, di-tolyl-guanidine, di-ortho-tolyl-guanidine and triphenyl-guanidine, to effect coagulation, and then vulcanizing the wet mix while confining same.

10. The method of coagulating rubber latex comprising mixing the latex with ethylene diamine and a reagent selected from the group consisting of di-phenyl-guanidine, di-tolyl-guanidine, di-ortho-tolyl-guanidine and triphenyl-guanidine at room temperature and heating the mixture.

HAROLD W. GREENUP.